(12) United States Patent
Yoshizawa et al.

(10) Patent No.: US 7,667,074 B2
(45) Date of Patent: Feb. 23, 2010

(54) METHOD FOR REGENERATING CATALYST FOR THE PRODUCTION OF METHACRYLIC ACID AND PROCESS FOR PREPARING METHACRYLIC ACID

(75) Inventors: Junya Yoshizawa, Niihama (JP); Yoshihiko Ohishi, Niihama (JP); Eiichi Shiraishi, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 5 days.

(21) Appl. No.: 11/907,362

(22) Filed: Oct. 11, 2007

(65) Prior Publication Data

US 2008/0293968 A1 Nov. 27, 2008

(30) Foreign Application Priority Data

Oct. 13, 2006 (JP) .............................. P2006-279718

(51) Int. Cl.
*C07C 57/02* (2006.01)
*B01J 38/66* (2006.01)

(52) U.S. Cl. ........................................ 562/598; 502/26

(58) Field of Classification Search ........................ None
See application file for complete search history.

(56) References Cited

U.S. PATENT DOCUMENTS

| 4,707,460 A | 11/1987 | Ishii et al. |
| 4,814,305 A | 3/1989 | Kamogawa et al. |
| 5,132,449 A | 7/1992 | Langerbeins et al. |
| 6,673,733 B2 | 1/2004 | Fukumoto et al. |
| 2004/0143132 A1 | 7/2004 | Kadowaki et al. |

FOREIGN PATENT DOCUMENTS

| DE | 3732106 A1 | 4/1989 |
| JP | 60-232247 A | 11/1985 |
| JP | 61-283352 A | 12/1986 |
| JP | 63-130144 A | 6/1988 |
| JP | 1-106841 A | 4/1989 |
| JP | 2001-286762 A | 10/2001 |
| JP | 2001-286763 A | 10/2001 |
| JP | 2007-90193 A | 4/2007 |

OTHER PUBLICATIONS

Search and Examination Report dated Aug. 7, 2009 for the corresponding Singapore Application No. 200716870-1.

*Primary Examiner*—Paul A Zucker
(74) *Attorney, Agent, or Firm*—Birch, Stewart, Kolasch & Birch, LLP

(57) ABSTRACT

A catalyst for the production of methacrylic acid comprising a heteropolyacid compound containing phosphorus and molybdenum is regenerated by a method comprising the steps of drying a mixture containing a deactivated catalyst, an ammonium ion, a nitrate ion and water, molding the dried mixture, firstly calcining the molded product in an atmosphere of an oxidizing gas at a temperature of 360 to 410° C., and then secondly calcining the product in an atmosphere of a non-oxidizing gas at a temperature of 420 to 500° C. The regenerated catalyst has substantially the same catalytic activity as a fresh catalyst in a gas phase catalytic oxidation reaction of methacrolein, isobutylaldehyde, isobutane or isobutyric acid to prepare methacrylic acid.

8 Claims, No Drawings

METHOD FOR REGENERATING CATALYST FOR THE PRODUCTION OF METHACRYLIC ACID AND PROCESS FOR PREPARING METHACRYLIC ACID

FIELD OF THE INVENTION

The present invention relates to a method for regenerating a catalyst for the production of methacrylic acid. The present invention also relates to a process for preparing methacrylic acid using a catalyst regenerated by such a regeneration method.

BACKGROUND ART

It is known that a catalyst for the production of methacrylic acid comprising a heteropolyacid compound containing phosphorus and molybdenum is deactivated when the catalyst is used for a long time in a gas phase catalytic oxidation reaction using methacrolein or the like as a raw material, because the catalytic activity the catalyst is reduced due to heat load or the like As a method for regenerating a deactivated catalyst, JP-A-61-283352 discloses a method comprising the steps of drying a mixture containing a deactivated catalyst, an ammonium ion and a nitrate ion and water, molding the dried mixture and then calcining the molded product in an air stream at 400° C.

JP-A-63-130144 discloses a method comprising the steps of drying a mixture of a deactivated catalyst and aqueous ammonia, dispersing the dried mixture in water, adding a nitrogen-containing heterocyclic compound and an amine or an ammonium carbonate thereto, mixing them, drying and molding the mixture, and then calcining the molded product in an air stream at a temperature of 300 to 450° C.

JP-A-60-232247 discloses a method comprising the steps of dispersing a deactivated catalyst in water, adding a nitrogen-containing heterocyclic compound and nitric acid thereto, mixing them, drying and molding the mixture, heating the molded product in an atmosphere of an inert gas such as nitrogen gas at a temperature of 200 to 600° C. under an atmospheric pressure or a reduced pressure to liberate the nitrogen-containing heterocyclic compound, and then calcining the molded product in an air stream at a temperature of 100 to 400° C.

JP-A-2001-286762 discloses a method comprising the steps of dispersing a deactivated catalyst in water, then adding a nitrogen-containing heterocyclic compound and nitric acid thereto, further adding a compound containing a constituent element disappeared from the catalyst, mixing them, drying and molding the mixture, calcining the molded product in an atmosphere of an inert gas such as nitrogen gas at a temperature of 200 to 600° C., and further calcining the product in an air stream at a temperature of 100 to 400° C.

JP-A-2001-286763 discloses a method comprising the steps of dispersing a deactivated catalyst in water, then adding a nitrogen-containing heterocyclic compound, ammonium nitrate and nitric acid thereto, mixing them, drying and molding the mixture, calcining the molded product in an atmosphere of an inert gas such as nitrogen gas at a temperature of 200 to 600° C., and further calcining the product in an air stream at a temperature of 100 to 400° C.

However, any of the conventional regeneration methods described above does not necessarily recover the catalytic activity or the catalyst life of the deactivated catalyst to a satisfactory extent.

SUMMARY OF THE INVENTION

An object of the present invention is to provide a method for regenerating a catalyst for the production of methacrylic acid, which can sufficiently recover the catalytic activity of a deactivated catalyst and impart a good catalyst life to the catalyst.

Another object of the present invention is to provide a process for preparing methacrylic acid using a catalyst regenerated by such a regeneration method while maintaining a high conversion and an excellent selectivity for a long time.

As the result of extensive study by the present inventors, it has been found that the above objects can be achieved by drying a mixture containing a deactivated catalyst, an ammonium ion, a nitrate ion and water, molding the dried mixture, firstly calcining the molded product in an atmosphere of an oxidizing gas at a temperature of 360 to 410° C., and then secondly calcining the product in an atmosphere of a non-oxidizing gas at a temperature of 420 to 500° C.

Accordingly, the present invention provides a method for regenerating a catalyst for the production of methacrylic acid comprising a heteropolyacid compound containing phosphorus and molybdenum, which method comprises the steps of drying a mixture containing a deactivated catalyst, an ammonium ion, a nitrate ion and water, molding the dried mixture, firstly calcining the molded product in an atmosphere of an oxidizing gas at a temperature of 360 to 410° C., and then secondly calcining the product in an atmosphere of a non-oxidizing gas at a temperature of 420 to 500° C.

Further, the present invention provides a process for preparing methacrylic acid comprising the steps of regenerating a catalyst for the production of methacrylic acid by the regeneration method according to the present invention and then subjecting a compound selected from the group consisting of methacrolein, isobutylaldehyde, isobutane and isobutyric acid to a gas phase catalytic oxidation reaction in the presence of the regenerated catalyst.

According to the present invention, the activity of a deactivated catalyst for the production of methacrylic acid can be effectively recovered, and the regenerated catalyst has a good catalyst life. In addition, the regenerated catalyst thus obtained can be used to prepare methacrylic acid while maintaining a high conversion and an excellent selectivity for a long time.

DETAILED DESCRIPTION OF THE INVENTION

The catalyst for the production of methacrylic acid, which is regenerated by the method of the present invention, comprises a heteropolyacid compound containing phosphorus and molybdenum as essential elements, and may comprise a free heteropolyacid or a salt of a heteropoly acid. Particularly, the catalyst preferably comprises an acid salt (i.e. a partially neutralized salt) of a heteropoly acid, more preferably an acid salt of a Keggin-type heteropoly acid.

Besides phosphorus and molybdenum, the catalyst preferably contains vanadium as an additional element, or at least one element selected from the group consisting of potassium, rubidium, cesium and thallium (hereinafter sometimes referred to as element X), or at least one element selected from the group consisting of copper, arsenic, antimony, boron, silver, bismuth, iron, cobalt, lanthanum and cerium (hereinafter sometimes referred to as element Y). Preferably, a catalyst contains 3 atoms or less of each of phosphorus, vanadium, element X and element Y, per 12 atoms of molybdenum.

When such a catalyst for the production of methacrylic acid is used in the production of methacrylic acid, or it encounters a thermal history, the catalytic activity is reduced. In the present invention, the deactivated catalyst with a reduced catalytic activity is a subject of the regeneration treatment.

In the regeneration treatment, a mixture containing the deactivated catalyst, an ammonium ion, a nitrate ion and water is first prepared. The preparation method of the mixture is not limited. For example, the deactivated catalyst may be suspended in water, followed by adding source materials of an ammonium ion and a nitrate ion, or the deactivated catalyst may be suspended in an aqueous solution containing an ammonium ion and a nitrate ion.

When the deactivated catalyst is a molded catalyst, it may be suspended as such, or it may be pulverized and then suspended. When fibers or the like as a reinforcing material are contained in the molded catalyst, the strength of the catalyst may be decreased if the fibers or the like are cut or broken. Thus, the molded catalyst is preferably pulverized without cutting or breaking the fibers or the like.

Examples of the source material of an ammonium ion include ammonia and ammonium salts such as ammonium nitrate, ammonium carbonate, ammonium hydrogencarbonate and ammonium acetate, preferably ammonia and ammonium nitrate. Examples of the source material of a nitrate ion include nitric acid and nitrates such as ammonium nitrate, preferably nitric acid and ammonium nitrate. The amounts of these source materials are suitably selected such that the amount of the ammonium ion is usually about 0.1 to 15 moles and the amount of the nitrate ion is usually about 0.1 to 15 moles, per 12 moles of molybdenum in the mixture.

As a source of water, ion-exchange water is usually used. The amount of water used is usually 1 to 20 parts by weight per 1 part by weight of molybdenum in the mixture.

Then, the above mixture is dried. Preferably, the mixture is heat-treated prior to drying.

The drying of the mixture may be carried out by any conventional method used in this art field, for example, evaporation to dryness, spray drying, drum drying, flash drying and the like.

When the mixture is heat-treated prior to drying, the heat treatment can be carried out in a closed vessel. The heat treatment temperature is preferably at least 100° C. The heat treatment time is usually at least 0.5 hour, preferably at least 2 hours, more preferably 2 to 10 hours.

The dried mixture is then molded in the form of a ring, a pellet, a sphere, a cylinder or any other suitable shape by tablet compression or extrusion molding. In this case, a molding aid such as ceramic fiber or glass fiber may be compounded in the mixture to reinforce the molded product.

In the regeneration method of the present invention, the molded product is firstly calcined in an atmosphere of an oxidizing gas at a temperature of 360 to 410° C. (the first calcination step), and secondly calcined in an atmosphere of a non-oxidizing gas at a temperature of 420 to 500° C. (the second calcination step). Such a two-step calcination process can effectively recover the catalytic activity and provide the regenerated catalyst having a long catalyst life.

The oxidizing gas used in the first calcination step is a gas containing an oxidizing material. A preferred example of such a gas is an oxygen-containing gas. The concentration of oxygen in the oxygen-containing gas is usually from about 1 to about 30% by volume. As a source of oxygen, an air or pure oxygen may be used, and it may be diluted with an inert gas, if necessary. The oxidizing gas may optionally contain water. However, the concentration of water in the oxidizing gas is usually 10% by volume or less. The source of oxygen is preferably an air. Usually, the first calcination step is carried out in the stream of the oxidizing gas.

A temperature in the first calcination step is usually from 360 to 410° C., preferably from 380 to 400° C. When the temperature in the first calcination step is too low, the activity of the deactivated catalyst is not sufficiently recovered. When this temperature is too high, the catalyst is decomposed so that the activity of the regenerated catalyst is not sufficiently high.

The non-oxidizing gas used in the second calcination step is a gas containing substantially no oxidizing material such as oxygen. Specific examples of the non-oxidizing gas include inert gas such as nitrogen, carbon dioxide, helium, argon, etc. The non-oxidizing gas may optionally contain water. However, the concentration of water in the non-oxidizing gas is usually 10% by volume or less. In particular, nitrogen gas is preferably used as a non-oxidizing gas. Usually, the second calcination step is carried out in the stream of the non-oxidizing gas.

A temperature in the second calcination step is usually from 420 to 500° C., preferably from 420 to 450° C. When the temperature in the second calcination step is too low, the activity of the deactivated catalyst is not sufficiently recovered. When this temperature is too high, the catalyst is decomposed so that the activity of the regenerated catalyst is not sufficiently high.

Prior to the first calcination step, the molded product is preferably heat treated (pre-calcined) in an atmosphere of an oxidizing gas or a non-oxidizing gas at a temperature of about 180 to about 300° C.

As explained above, the molded product is calcined. In a preferred embodiment, prior to the calcination, the molded product is conditioned, that is, the molded product is exposed to an atmosphere at a temperature of 40 to 100° C. and a relative humidity of 10 to 60% for 0.5 to 10 hours. Thereby, the catalytic activity and the catalyst life of the regenerated catalyst can be recovered more effectively, and furthermore the strength of the catalyst can be improved. This conditioning may be carried out by placing the molded article in a temperature and humidity-conditioned vessel, or by blowing a temperature and humidity-conditioned gas to the molded product. Usually, an air is used as an atmospheric gas used in the conditioning process, although an inert gas such as nitrogen gas may be used.

After the two-step calcination, the regenerated catalyst is obtained. The regenerated catalyst comprises a heteropolyacid compound, and may comprise a free heteropolyacid or a salt of a heteropolyacid. In particular, the regenerated catalyst preferably comprises an acid salt of a heteropoly acid, more preferably an acid salt of Keggin-type heteropoly acid. More preferably, a structure of the Keggin-type heteropolyacid salt is formed upon the heat treatment (pre-calcination).

Such a regenerated catalyst has substantially the same catalytic activity and durability as those of a fresh catalyst. In the presence of the regenerated catalyst, a raw material such as methacrolein is subjected to a gas phase catalytic oxidation reaction, whereby methacrylic acid can be produced while maintaining a high conversion and an excellent selectivity for a long time.

Methacrylic acid is usually prepared by charging the catalyst in a fixed-bed multitubular reactor and supplying a starting gas mixture containing oxygen and a raw material selected from the group consisting of methacrolein, isobutylaldehyde, isobutane and isobutyric acid, although a reaction system such as a fluidized bed or a moving bed may also be used. As an oxygen source, an air is usually used. Besides oxygen and the above-mentioned raw material, the starting gas mixture may contain nitrogen, carbon dioxide, carbon monoxide, water vapor, etc.

For example, when methacrolein is used as a raw material, the reaction is carried out usually under conditions such that a concentration of methacrolein in the starting gas is 1 to 10% by volume, a molar ratio of oxygen to methacrolein is 1 to 5, a space velocity is 500 to 5000 $h^{-1}$ (based on the normal state), a reaction temperature is 250 to 350° C., and a reaction pressure is 0.1 to 0.3 MPa. The starting methacrolein used may not necessarily be a purified product with a high purity and may be, for example, a methacrolein-containing reaction product gas obtained by a gas phase catalytic oxidization reaction of isobutylene or tert-butyl alcohol.

When isobutane is used as a raw material, the reaction is carried out usually under conditions such that a concentration of isobutane in the starting gas is 1 to 85% by volume, a water vapor concentration is 3 to 30% by volume, a molar ratio of oxygen to isobutane is 0.05 to 4, a space velocity is 400 to 5000 $h^{-1}$ (based on the normal state), a reaction temperature is 250 to 400° C., and a reaction pressure is 0.1 to 1 MPa. When isobutyric acid or isobutylaldehyde is used as a raw material, substantially the same reaction conditions as those employed when methacrolein is used as the raw material are adopted.

EXAMPLES

Hereinafter, the present invention is explained in more detail by reference to the Examples, which do not limit the scope of the present invention in any way.

An air used in the Examples contains 2% by volume of water (corresponding to the water content of an atmosphere), and nitrogen used in the Examples is substantially free of water.

A conversion and a selectivity are defined as follows:

Conversion (%)=[(moles of methacrolein reacted)/(moles of methacrolein fed)]×100

Selectivity (%)=[(moles of methacrylic acid generated)/(moles of methacrolein reacted)]×100

Reference Example 1

Preparation of Fresh Catalyst and Evaluation of Fresh Catalyst

In 224 kg of ion-exchange water heated to 40° C., 38.2 kg of cesium nitrate [$CsNO_3$], 27.4 kg of 75 wt % orthophosphoric acid, and 25.2 kg of 70 wt % nitric acid were dissolved to prepare Solution A. Separately, 297 kg of ammonium molybdate tetrahydrate [$(NH_4)_6Mo_7O_{24}\cdot 4H_2O$] was dissolved in 330 kg of ion-exchange water heated to 40° C., followed by suspending 8.19 kg of ammonium metavanadate [$NH_4VO_3$] thereinto prepare Solution B. Solutions A and B were adjusted to 40° C. After Solution A was dropwise added to Solution B while stirring, the mixture was further stirred for 5.8 hours at 120° C. in a closed vessel, and then a suspension of 10.2 kg of antimony trioxide [$Sb_2O_3$] and 10.2 kg of copper nitrate trihydrate [$Cu(NO_3)_2\cdot 3H_2O$] in 23 kg of deionized water was added thereto. Then, the mixture was stirred at 120° C. for 5 hours in the closed vessel. The mixture thus obtained was dried with a spray dryer. To 100 parts by weight of the resulting dried powder, 4 parts by weight of ceramic fibers, 13 parts by weight of ammonium nitrate and 9.7 parts by weight of ion-exchange water were added, and the resulting mixture was kneaded and extrusion-molded into cylinders each having a diameter of 5 mm and a height of 6 mm. The molded product was dried at a temperature of 90° C. and a relative humidity of 30% for 3 hours, and then heat-treated (pre-calcinated) at 220° C. for 22 hours in an air stream and then at 250° C. for 1 hour in an air stream, and thereafter, heated to 435° C. in a nitrogen stream and kept at the same temperature for 3 hours. Then, the product was cooled to 300° C. in a nitrogen stream. After changing the nitrogen stream to an air stream, the product was heated to 390° C. in the air stream and kept at the same temperature for 3 hours. Thereafter, the product was cooled to 70° C. in an air stream, and the catalyst was recovered.

This catalyst contained an acid salt of Keggin-type heteropoly acid containing phosphorus, molybdenum, vanadium, antimony, copper and cesium at an atomic ratio of 1.5, 12, 0.5, 0.5, 0.3 and 1.4 respectively.

[Measurement of BET Specific Surface Area]

About one gram of the catalyst obtained in Reference Example 1 was degassed under vacuum, then dehydrated at 120° C. and subjected to the measurement of a BET specific surface area. The results are shown in Table 1.

[Activity Test of Catalyst]

Nine grams (9 g) of the catalyst obtained in Reference Example 1 were charged into a glass micro-reactor having an inner diameter of 15 mm, and a starting gas composed of 4% by volume of methacrolein, 12% by volume of molecular oxygen, 17% by volume of water vapor, and 67% by volume of nitrogen, prepared by mixing methacrolein, air, steam and nitrogen, was fed thereto at a space velocity of 670 $h^{-1}$ and reacted at a furnace temperature of 280° C. (a temperature of a furnace for heating the micro-reactor), and a conversion and a selectivity after 1 hour from the start of the reaction were determined.

Next, in order to evaluate the durability of the catalytic activity, a starting gas having the same composition as mentioned above was fed thereto at the same space velocity as mentioned above, and reacted at a furnace temperature of 355° C., thereby forcibly deteriorating the catalyst. Thereafter, a starting gas having the same composition as mentioned above was fed thereto at the same space velocity as mentioned above, and reacted at a furnace temperature of 280° C., and a conversion and a selectivity after 1 hour from the start of the reaction were determined. The conversion and the selectivity before and after the forced deterioration are shown in Table 1.

[Measurement of Catalyst Life]

Through a glass-made microreactor having an inner diameter of 15 mm filled with 4.5 g of the catalyst obtained in Reference Example 1, a raw material gas containing 4% by volume of methacrolein, 12% by weight of molecular oxygen, 17% by volume of water vapor and 67% of nitrogen gas, which was prepared by mixing methacrolein, molecular oxygen, water vapor and nitrogen gas, was supplied at a space velocity of 1,340 $hr^{-1}$ and reacted at a furnace temperature of 330° C. for 50 days or longer. During this reaction period, a conversion was determined every 7 to 10 days. The results were plotted with a reaction time on a an abscissa and a conversion on an ordinate. The reaction time and the conversion had substantially a linear relation. A slope of the line was calculated by the least-square method and then a decreasing rate of the conversion (%/day) was calculated. The results are shown in Table 1.

Reference Example 2

Recovery and Evaluation of Deactivated Catalyst

The fresh catalyst prepared in Reference Example 1 was treated at 450° C. for 5 hours in an air stream to prepare a deactivated catalyst. The deactivated catalyst was subjected to the BET specific surface area measurement and activity test in the same manners as those in Reference Example 1. The results are also shown in Table 1.

Example 1

Regeneration of Catalyst and Evaluation of Regenerated Catalyst

Two hundred grams (200 g) of the deactivated catalyst obtained in Reference Example 2 was suspended in 400 g of ion-exchange water heated to 80° C., and then kept for 1 hour. This suspension was allowed to cool down to a room temperature, and then 60.2 g of ammonium nitrate [NH$_4$NO$_3$] was added thereto and the mixture was heated to 70° C. and kept at the same temperature for 1 hour. Thereafter, 17.9 g of 25 wt % aqueous ammonia was added. After being kept at 70° C. for 1 hour, the mixture was heat-treated at 120° C. for 5 hours while stirring in a closed vessel. Thereafter, the mixture was dried at 110° C., and to 100 parts by weight of the resulting dried product were added 6 parts by weight of ion-exchange water, and the mixture was kneaded and extrusion-molded into cylinders each having a diameter of 5 mm and a height of 6 mm. This molded product was kept in an atmosphere having a relative humidity of 30% at 90° C. for 3 hours, and then heat treated in an air stream at 220° C. for 22 hours and further in an air stream at 250° C. for one hour. Thereafter, the molded product was heated to 390° C. in an air stream and kept at that temperature for 3 hours (the first calcination step). After that, the air stream was switched to a nitrogen stream, and the product was heated to 435° C. in the nitrogen stream and kept at that temperature for 3 hours (the second calcination step). Thereafter, the product was cooled to 70° C. in the nitrogen stream, and the catalyst was recovered. The resulting regenerated catalyst was subjected to the BET specific surface area measurement, activity test and catalyst life measurement in the same manners as those in Reference Example 1. The results are shown in Table 1.

Comparative Example 1

The same procedure as in Example 1 was repeated except that, after the heat-treatment (pre-calcination), the molded product was heated to 435° C. and kept at that temperature for 3 hours (the first calcination step), then cooled to 300° C. in a nitrogen stream, the nitrogen stream was switched to an air stream, the molded product was heated to 390° C. in the air stream and kept at that temperature for 3 hours for 3 hours, then the product was cooled to 70° C. in the air stream, and the catalyst was recovered. The regenerated catalyst was subjected to the BET specific surface area measurement, activity test and catalyst life measurement in the same manners as those in Reference Example 1. The results are shown in Table 1.

TABLE 1

|  |  | Reference Example 1 | Reference Example 2 | Example 1 | Comparative Example 1 |
|---|---|---|---|---|---|
| Catalyst | | Fresh catalyst | Deactivated catalyst | Regenerated catalyst | Regenerated catalyst |
| Calcination steps | First calcination step | — | — | Air stream, 390° C. × 3 hrs | N$_2$ stream, 435° C. × 3 hrs |
|  | Second calcination step | — | — | N$_2$ stream, 435° C. × 3 hrs | Air stream, 390° C. × 3 hrs |
| BET specific surface area (m$^2$/g) | | 13 | 7 | 9 | 7 |
| Activity test | Before forced deterioration Conversion (%) | 99 | 30 | 92 | 96 |
|  | Selectivity (%) | 70 | 81 | 81 | 80 |
|  | After forced deterioration Conversion (%) | 87 | 4 | 94 | 83 |
|  | Selectivity (%) | 84 | 36 | 82 | 86 |
| Catalyst life | Decreasing rate of conversion (%/day) | 0.2 | — | 0.3 | 0.8 |

The invention claimed is:

1. A method for regenerating a catalyst for the production of methacrylic acid comprising a heteropolyacid compound containing phosphorus and molybdenum, which method comprises the steps of drying a mixture containing a deactivated catalyst, an ammonium ion, a nitrate ion and water, molding the dried mixture, firstly calcining the molded product in an atmosphere of an oxidizing gas at a temperature of 360 to 410° C., and then secondly calcining the product in an atmosphere of a non-oxidizing gas at a temperature of 420 to 500° C.

2. The method according to claim 1, wherein said mixture is heat-treated at a temperature of at least 100° C. for at least 2 hours prior to drying.

3. The method according to claim 1, wherein said dried mixture is exposed to an atmosphere having a relative humidity of 10 to 60% at a temperature of 40 to 100° C. for 0.5 to 10 hours prior to the first calcination.

4. The method according to any one of claims 1 to 3, wherein the heteropolyacid compound further comprises vanadium, at least one element selected from the group consisting of potassium, rubidium, cesium and thallium, and at least one element selected from the group consisting of copper, arsenic, antimony, boron, silver, bismuth, iron, cobalt, lanthanum and cerium.

5. A process for preparing methacrylic acid comprising the steps of:

regenerating a catalyst for the production of methacrylic acid by the method according to claim 1 and then subjecting at least one compound selected from the group consisting of methacrolein, isobutylaldehyde, isobutane and isobutyric acid to a gas phase catalytic oxidation reaction in the presence of the regenerated catalyst.

6. A process for preparing methacrylic acid comprising the steps of:
regenerating a catalyst for the production of methacrylic acid by the method according to claim 2 and then
subjecting at least one compound selected from the group consisting of methacrolcin, isobutylaldehyde, isobutane and isobutyric acid to a gas phase catalytic oxidation reaction in the presence of the regenerated catalyst.

7. A process for preparing methacrylic acid comprising the steps of:
regenerating a catalyst for the production of methacrylic acid by the method according to claim 3 and then
subjecting at least one compound selected from the group consisting of methacrolein, isobutylaldehyde, isobutane and isobutyric acid to a gas phase catalytic oxidation reaction in the presence of the regenerated catalyst.

8. A process for preparing methacrylic acid comprising the steps of:
regenerating a catalyst for the production of methacrylic acid by the method according to claim 4 and then
subjecting at least one compound selected from the group consisting of methacrolein, isobutylaldehyde, isobutane and isobutyric acid to a gas phase catalytic oxidation reaction in the presence of the regenerated catalyst.

* * * * *